(12) United States Patent
Ducharme et al.

(10) Patent No.: US 8,559,626 B2
(45) Date of Patent: *Oct. 15, 2013

(54) CRYPTOGRAPHIC SANCTION SERVER AND METHODS FOR USE THEREWITH

(75) Inventors: Paul D. Ducharme, Richmond Hill (CA); Heyun Zheng, Toronto (CA)

(73) Assignee: VIXS Systems, Inc, Toronto, Ontario (CA)

( * ) Notice: Subject to any disclaimer, the term of this patent is extended or adjusted under 35 U.S.C. 154(b) by 166 days.

This patent is subject to a terminal disclaimer.

(21) Appl. No.: 13/164,047

(22) Filed: Jun. 20, 2011

(65) Prior Publication Data

US 2012/0221846 A1 Aug. 30, 2012

Related U.S. Application Data

(60) Provisional application No. 61/446,495, filed on Feb. 24, 2011, provisional application No. 61/496,261, filed on Jun. 13, 2011.

(51) Int. Cl.
*H04K 1/00* (2006.01)
*H04L 9/00* (2006.01)

(52) U.S. Cl.
USPC .............................................. 380/28; 713/153

(58) Field of Classification Search
USPC .......... 380/28, 30, 44–47, 201, 268; 713/153, 713/189
See application file for complete search history.

(56) References Cited

U.S. PATENT DOCUMENTS

| | | | |
|---|---|---|---|
| 6,937,729 B2 * | 8/2005 | Akins et al. | 380/239 |
| 7,383,438 B2 * | 6/2008 | Fahrny et al. | 713/169 |
| 7,697,686 B2 * | 4/2010 | Puiatti et al. | 380/239 |
| 7,978,848 B2 * | 7/2011 | Zhu et al. | 380/44 |
| 8,205,243 B2 * | 6/2012 | Wasilewski | 726/2 |
| 2004/0088558 A1 * | 5/2004 | Candelore | 713/193 |
| 2007/0180224 A1 * | 8/2007 | Nakano et al. | 713/150 |
| 2009/0210701 A1 * | 8/2009 | Zhang et al. | 713/156 |

OTHER PUBLICATIONS

G.F., Keys to the cloud castle, The Economist, May 18, 2011, 3 pages, Seattle, WA [downloaded from the internet: http://www.economist.com/blogs/babbage/2011/05/internet_security].

Derek Newton, Dropbox authentication: insecure by design, Apr. 7, 2011, 3 pages downloaded from the internet: [http://dereknewton.com/2011/04/dropbox-authentication-static-host-ids/].

* cited by examiner

*Primary Examiner* — Beemnet Dada
(74) *Attorney, Agent, or Firm* — Garlick & Markison; Bruce E. Stuckman

(57) ABSTRACT

A sanction server includes a network interface that receives a request for media content from a client device and transmits first sanction data to a caching server and second sanction data to the client device. A sanction processing module generates the first sanction data based on a random number and generates the second sanction data based on the random number. The caching server generates first cryptographic data based on the first sanction data and sends the first cryptographic data to the client device. The client device generates second cryptographic data based on the first sanction data and sends the second cryptographic data to the caching server. The caching server generates a scrambling control word based on the first sanction data and the second cryptographic data. The client device generates the scrambling control word based on the second sanction data and the first cryptographic data.

13 Claims, 15 Drawing Sheets

CRYPTOGRAPHIC SANCTION SERVER AND METHODS FOR USE THEREWITH

CROSS REFERENCE TO RELATED PATENTS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/446,495, entitled "CRYPTOGRAPHIC SANCTIONING METHODS,", filed Feb. 24, 2011, pending.
2. U.S. Provisional Application Ser. No. 61/496,261, entitled "CRYPTOGRAPHIC SANCTION SERVER AND METHODS FOR USE THEREWITH,", filed Jun. 13, 2011, pending.

TECHNICAL FIELD OF THE INVENTION

The present invention relates to secure distribution and protection of content such as media content.

DESCRIPTION OF RELATED ART

Traditionally cryptographic data operations can be categorized into four types: confidentiality; integrity; authentication; and non-repudiation. Confidentiality operations can be used to keep data secret. This category of operations typically relies on symmetric cryptographic algorithms like AES, DES, 3DES, C4, DVB-CSA2, DVB-CSA3, Multi2, etc. The purpose of these algorithms is to scramble data (i.e. S(data, CW)) to be exchanged using a Control Word (CW) in order to conceal or obfuscate the data from unauthorized access. The data may only be de-scrambled (i.e. D(data, CW)) if the recipient has the correct CW. In this transaction the exchange of the CW between the transmitter and the receiver is typically performed by means of an asymmetrical algorithm such as RSA, ECC, etc. The CW is encrypted (i.e. E(CW, Key)) where the public Key is derived or pre-agreed upon by the two parties. Here the objective is to conceal or obfuscate the CW from unauthorized access.

Cryptographic operations can also be used for data integrity, to keep data un-altered. This category of operations typically relies on hashing or one-way algorithms like SHA-1, SHA-256, etc. The purpose of these algorithms is to calculate a Message Digest over the data (i.e. MD(data)) to be transmitted. The Message Digest associated with the data is used to verify that the data has not been modified in transit.

Cryptographic operations can further be used for authentication, to verify the source of data. This category of operations typically relies on asymmetrical cryptographic algorithms like RSA, ECC, etc. and signing algorithms as used in the integrity category. The asymmetrical algorithm private key is used to encrypt a Message Digest (i.e. signature=E(MD (data),Private Key)), only the asymmetric public key may be used to decrypt the encrypted signature (i.e. MD=D(E(MD (data),Private Key),Public Key)). In this way, if the decrypted signature matches the calculated Message Digest then the data is guaranteed to have been signed by the Signing authority (i.e. only the signing authority should have the private key).

Cryptographic operations can additionally be used for non-repudiation, to prevent against denial by an authorized sender having sent the data. This category of operations is similar to authentication however in this case the encrypted signature is used to verify that a particular authorized party signed the data (i.e. once signed the signer may not claim that they are not the party signing the data).

The limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
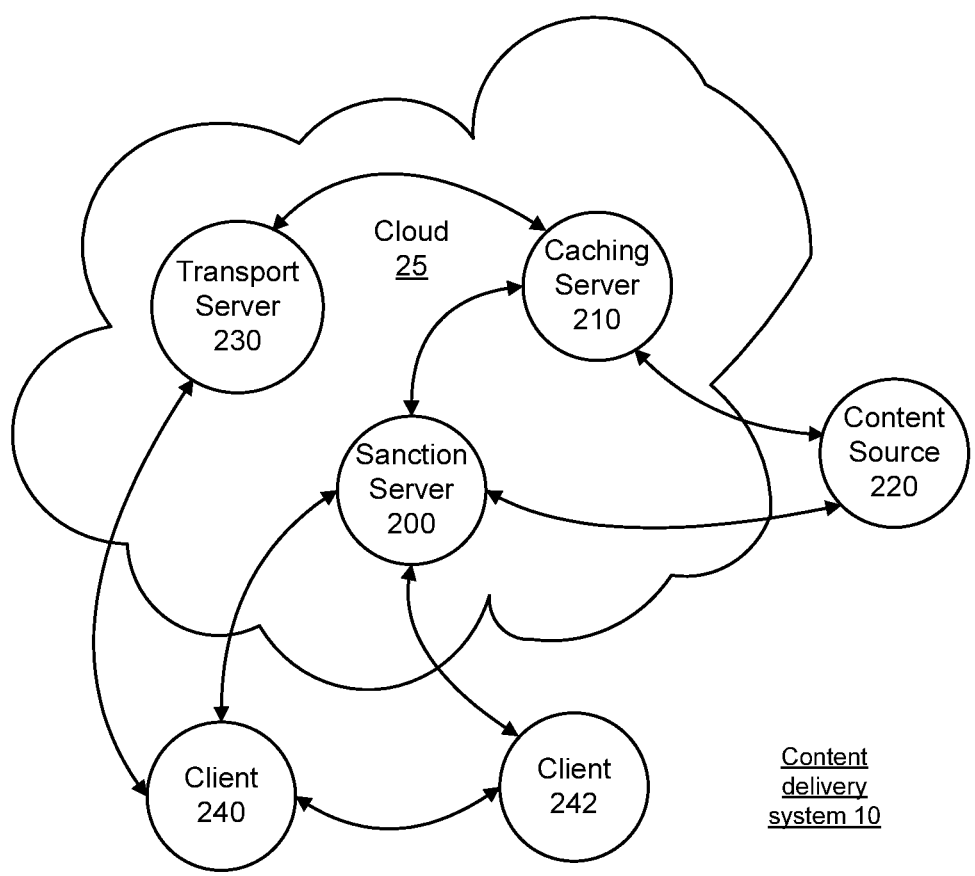
FIG. 1 presents a data flow diagram representation of a content delivery system 10 in accordance with an embodiment of the present invention.

FIG. 1 presents a data flow diagram representation of a content delivery system 10 in accordance with an embodiment of the present invention. In particular, the content delivery system 10 includes a content sanction server 200, caching server 210, content source 220, transport server 230, and two or more clients 240 and 242 that are interconnected via a cloud 25 such as a cloud computing topology involving many parties. In such a cloud 25, the parties may have complex commercial and cryptographic relationships which may operate over one or more networks or other connections such as the Internet, another wide area network, broadband wireless or terrestrial networks such as satellite, cable, cellular, or telephone company networks, or other public or private networks. The clients 240 and 242 can be set top boxes, televisions, personal computers, smart phones, internet tablets or other client devices that receive content originating from a content source. The caching server 210 can be any server that stores content from a content source 220. The Transport server can be a server of a multi-service operator, Internet service provider, network node or other server.

The content delivery system 10 delivers content from the content source 220 and stored on caching server 210 to clients 240 and 242, optionally via one or more transport servers 230. The content can be any data which has commercial value. For example, content may involve Audio/Video content or other media such as a movie, a song, an image, an electronic book, paper, article, an application program, applet, tool, data associated with a financial transaction with an ATM, purchase of goods on the Internet, etc. Content can also include data associated with any electronic transaction involving the exchange of goods or services which must be protected by cryptographic methods. Content source 220 can include television or cable channel or network, an electronic book store, software, music or book publisher, financial institution, website, e-tailer, or other source of content.

The content delivery system 10 utilizes cryptographic sanctioning, a new category of cryptographic operation which lends itself to modern distributed content topologies in particular it is useful for overseeing cryptographic transactions associated with cloud computing, such as in cloud 25 or other network configuration. Content delivery system 10 operates in accordance with a cryptographic sanction operation performed by a sanctioning authority, such as sanction server 200 which issues a sanction to authorize or enable a separate cryptographic operation between two independent parties. Without the sanction from the sanctioning authority, the intended cryptographic operation between the parties cannot occur.

A cryptographic sanction involves three or more parties associated with a transaction which involves secure delivery of content. The parties minimally are a Cryptographic Client (CC) such as clients 240 and 242, a Cryptographic Server (CCS), such as caching server 210 and a Cryptographic Sanctioning Authority (CSA), such as sanction server 200. The Cryptographic Clients are the requestor and typically the consumer of the content. The CC may or may not own the content after the transaction. Typically clients are the party that will pay for and receive the content. The Cryptographic Server is the provider and/or caretaker of the content. Typically the CCS may collect an administration fee for the service provided but often does not own the content. The primary function of the CS is to cache the content and to provide for secure delivery of the content to the CC. The Cryptographic Sanctioning Authority is a third party who typically owns the content and wishes to collect a fee for the delivery of the content to the CC. The CSA does not have to be an active participant in the transfer of the content between the CCS and CC but the CSA must participate in the key exchange between the CCS and the CC in order to cryptographically enforce its ownership and/or distribution rights over the content and to record the transaction for billing purposes.

Further details including several example implementations and optional functions and features are presented in conjunction with FIGS. 2-20 that follow.

Figure 2:
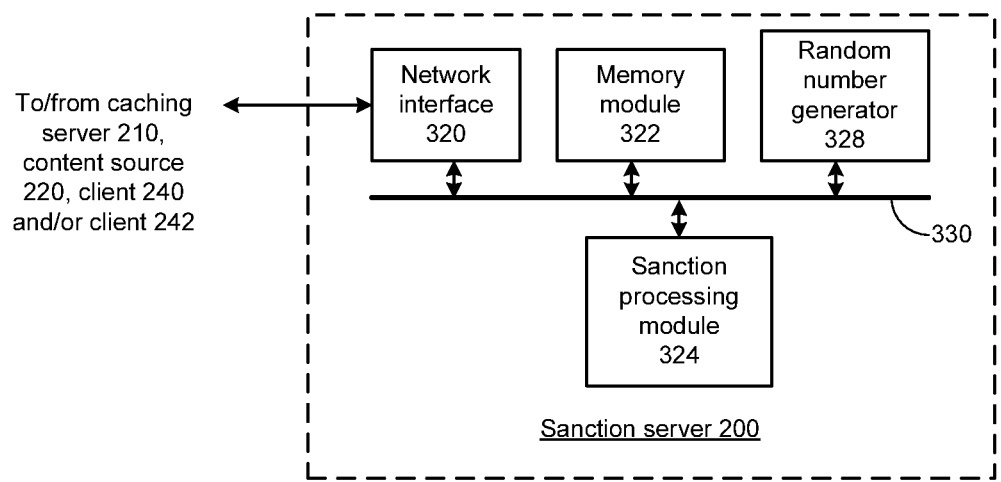
FIG. 2 presents a block diagram representation of a sanction server 200 in accordance with an embodiment of the present invention.

FIG. 2 presents a block diagram representation of a sanction server 200 in accordance with an embodiment of the present invention. In particular, sanction server 200 includes a network interface 320, such as a network card, modem or other device that that provides bidirectional data communication at least one network of cloud 25. The sanction server 200 further includes a sanction processing module 324, memory module 322 and a random number generator 328 that are connected via data bus 330. While random number generator 328 is shown as a separate device, it can optionally be implemented in software or firmware stored in memory module 322 and executed by a processor such as sanction processing module 324 or other processor.

The sanction processing module 324 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 322. Memory module 322 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

In operation, the network interface 320 receives a request for the media content from a client device, such as client 240 or 242. The random number generator 328 generates a random number. The sanction processing module 324, in response to the request for the media content, generates first sanction data based on the random number and also generates second sanction data based on the random number. The sanction processing module 324 further generates, in response to the request for the media content, notification data that indicates the requesting client device and the media content that was requested. The network interface 320 transmits the first sanction data and the notification data to the caching server 210. The network interface 320 also sends second sanction data to the requesting client device 240 or 242. In response, the caching server 210 generates first cryptographic data based on the first sanction data and sends the first cryptographic data to the requesting client device 240 or 242. The requesting client device 240 or 242 generates second cryptographic data based on the first sanction data and reciprocates by sending the second cryptographic data to the caching server 210. The caching server 210 generates a scrambling control word based on the first sanction data and the second cryptographic data, and scrambles the media content using this control word. The requesting client device 240 or 242 independently generates the scrambling control word based on the second sanction data and the first cryptographic data and descrambles the media content using the negotiated scrambling control word.

The scrambling described above can employ any of various symmetric algorithms such as AES, DES, TDES, etc. to scramble the media content under control of a Control Word (CW). Scrambling operations can be represented by the expression S(Content, CW) (i.e. content is scrambled using the CW). The converse operation of scrambling is de-scrambling which can be represented by:

Content=$D(S(\text{Content}, CW), CW)$

In one embodiment of the present invention, the sanctioning methods of sanction server 200, caching server 220 and clients 240 and 242 operate in accordance with the Rivest, Shamir, Adelman (RSA) cryptography algorithm. In particular, these sanctioning methods based on RSA rely on the mathematical properties of exponentiation modulus n as follows;

Property #1:

$(((X^a) \bmod n)^b \bmod n)^c \bmod n = (((X^c) \bmod n)^b \bmod n)^a \bmod n$

And, $(((X^c) \bmod n)^b \bmod n)^a \bmod n = (((X^b) \bmod n)^c \bmod n)^a \bmod n$ i.e. the order of exponentiation modulus n may be performed in any order to calculate the same result. Note these may be extended to as many exponentiations as desired $\{a, b, c, \ldots, d\}$ $((((((X^a) \bmod n)^b \bmod n)^c \bmod n) \ldots)^d \bmod n)$ Property #2:
V and U have the mathematical property $(X^u \bmod n)^v \bmod n = X$ i.e. the typical RSA convention is to refer to U, V as the public/private keys with respect to modulus n.

Property #3:
Given $(X^u \bmod n)^v \bmod n = X$ is true (as per property #2), if only $X^u \bmod n$ is known, then it is computationally infeasible to determine X without V.

The operation of an RSA-based sanction can be illustrated in conjunction with the example that follows where a cryptographic client (CC), cryptographic caching server (CCS) and cryptographic sanctioning authority are implemented via (CSA) sanction server 200, caching server 220 and clients 240 and 242.

1. The cryptographic client (CC) requests content from cryptographic sanctioning authority (CSA).
2. The cryptographic sanctioning authority (CSA) authenticates the cryptographic client and/or client request and generates the following:

X=RN1 where X=$\{0,1,2, \ldots, n-1\}$, and RN1 is a random number.

The CSA uses this random dumber to generate sanction data for transmission to the CC and the CS. Given (U, V) such that $(X^U \bmod n)^V \bmod n = X$ $A = X^U \bmod n$ and $B = X^V \bmod n$ The CSA then forwards the sanction data $\{B, V, n\}$ to the Client (CC) and the sanction data $\{A, U, n\}$ to the cryptographic caching server (CCS) along with a notification to the CCS that the CC has requested a particular content.
3. The cryptographic caching server CCS generates its own random number C=RN2, where C=$\{0,1,2, \ldots, n-1\}$, And then generates cryptographic data based on this random number $C' = A^C \bmod n$ The CCS then forwards the cryptographic data C' to the CC.
4. The cryptographic client (CC) also generates its own random number D=RN3, where D=$\{0,1,2, \ldots, n-1\}$, And also generates its own cryptographic data based on this random number $D' = B^D \bmod n$ The CC then forwards D' to the CS.
5. The CCS then calculates the control word based on $$CW = (D'^C \bmod n)^U \bmod n$$
$$= ((B^D \bmod n)^C \bmod n)^U \bmod n$$
$$= (((X^V \bmod n)^D \bmod n)^C \bmod n)^u \bmod n$$
$$= ((X)^D \bmod n)^C \bmod n$$

6. The CC also calculates the control word $$CW = (C'^D \bmod n)^V \bmod n$$
$$= ((A^C \bmod n)^D \bmod n)^V \bmod n$$
$$= (((X^U \bmod n)^C \bmod n)^D \bmod n)^V \bmod n$$
$$= ((X)^C \bmod n)^D \bmod n$$

7. The CCS then uses CW to scramble the content (i.e. S(content, CW)) and sends the scrambled content to the CC.
8. The CC uses its own calculations for the same CW to de-scramble the content content=$D(S(\text{content}, CW), CW)$ The cryptographic client and cryptographic caching server calculations result in the same CW value and this value may now be used as the CW to scramble/de-scramble the content sent from the server to the client. In this relationship the CSA does not participate in the actual transfer or scrambling of content between the cryptographic client and cryptographic caching server but the operation cannot proceed without the knowledge and participation of the CSA (i.e. the CSA must sanction the exchange).

In another embodiment of the present invention, the sanctioning methods of sanction server 200, caching server 210 and clients 240 and 242 operate in accordance with the elliptic curve cryptography (ECC). In particular the first sanction data, the second sanction data, the first cryptographic data and the second cryptographic data are generated in accordance with the elliptic curve cryptography algorithm. Sanctioning methods based on ECC rely on the mathematical property of point multiplication over a finite field as follows. ECC cryptographic algorithms are based upon cryptographic schemes, primitives, and encoding methods described in the Institute for Electrical and Electronics Engineers (IEEE) 1363-2000.

Property #1:

$$C(B(A\ G(x,y)))=A(B(C\ G(x,y)))=B(A(C\ G(x,y)))$$

i.e. the order of ECC point multiplication may be performed in any order to calculate the same result.

Property #2:

These may be extended to as many point multiplication as desired {A, B, C, . . . , D}

$$A(B(C(\ldots(D\ G(x,y))\ldots)))$$

Property #3:

Given $G(x,y)$ and K and $P(x,y)=K\ G(x,y)$ then it is computationally infeasible to calculate K given $P(x,y)$ and to calculate $G(x,y)$ given $P(x,y)$ and K.

The operation of an ECC-based sanction can be illustrated in conjunction with the example that follows where a cryptographic client (CC), cryptographic caching server (CCS) and cryptographic sanctioning authority are implemented via (CSA) sanction server 200, caching server 210 and clients 240 and 242.

1. The cryptographic client (CC), requests content from cryptographic sanctioning authority (CSA).
2. The cryptographic sanctioning authority (CSA) authenticates the client and generates the following random numbers $a=RN1,\ b=RN2,\ c=RN3$ where $\{a,b,c\}=\{0,1,\ldots,n-1\}$ The CSA also generates the following sanction data based on these random numbers $$S(x,y)=c\ G(x,y)$$

$$A(x,y)=a\ S(x,y)$$

$$B(x,y)=b\ S(x,y)$$

The CSA then forwards {b, B(x,y), n} to the CC and {a, A(x,y), n} to the CCS along with a notification to the CS that the CC has requested the particular content.
3. The cryptographic caching server (CCS) also generates the following random number $e=RN4$, where $e=\{0,1,\ldots,n-1\}$ And further generates the following cryptographic data based on the random number $$E(x,y)=e\ A(x,y)$$

The CCS then forwards the cryptographic data {E(x,y)} to the CC.
4. The cryptographic client (CC) also generates the following random number $d=RN5$, where $d=\{0,1,\ldots,n-1\}$ And further generates the following cryptographic data based on the random number
    $D(x,y)=d\ B(x,y)$ calculates the following;
    The cryptographic client then forwards the cryptographic data {D(x,y)} to the CS.
5. The cryptographic caching server (CCS) then calculates the control word as $$CW=a\ e\ D(x,y)=a\ e\ d\ B(x,y)=a\ e\ d\ b\ S(x,y)=a\ e\ d\ b\ c\ G(x,y)$$

6. The cryptographic client then calculates the control word as $$CW=b\ d\ E(x,y)=b\ d\ e\ A(x,y)=b\ d\ e\ a\ S(x,y)=b\ d\ e\ a\ c\ G(x,y)$$

7. The cryptographic caching server (CCS) then uses CW to scramble the content (i.e. S(content, CW)) which is forwarded to the CC.
8. The cryptographic client then uses its own version of the same CW to de-scramble the content $$content=D(S(content,CW),CW)$$

As with the RSA-based example, the cryptographic client and cryptographic caching server calculations result in the same CW value and this value may now be used as the CW to scramble/de-scramble the content sent from the server to the client. In this relationship the CSA does not participate in the actual transfer or scrambling of content from the cryptographic client and cryptographic caching server but the operation cannot proceed without the knowledge and participation of the CSA (i.e. the CSA must sanction the exchange).

In the above description of basic RSA and ECC cryptographic sanction operations the cryptographic caching server (CCS) has access to the CW and the clear content. In some cases it may be advantageous to not allow the CCS to have access to the CW or the clear content. This allows the content source 220 to impose additional restrictions on the distribution of the content in cases for example where the CCS is not trusted. In this scenario the content is pre-scrambled by the content source 220 before it is released to the CS, the cryptographic sanctioning authority is provided with the content source's proxy in the form of proxy data (i.e. information which allows the Sanctioning Authority or the Cryptographic caching server to operate but not sufficient to derive the CW). The proxy data may also include information with respect to the distribution rights associated with the content, i.e. it may identify "who or what device or devices" are permitted to access the content and/or any restrictions which are to be imposed on CC's with respect to the content. Only the content source 220 has access to the CW and clear content.

In an embodiment of the present invention, the network interface 320 of sanction server 200 receives proxy data from the content source 220. The proxy data includes cryptographic parameters that are generated based on a scrambling control word used to scramble the media content. In response to a request for the media content from a client device 240 or 242, the sanction processing module 324 generates notification data that indicates the requesting client device 240 or 242 and the requested media content. The network interface 320 transmits the proxy data to the requesting client device 240 or 242 and transmits notification data to the caching server 210. The content source 220 generates cryptographic data and sends the cryptographic data and the scrambled media content to the caching server 210. The caching server 210 forwards the cryptographic data and the scrambled media content to the requesting client device 240 or 242. The requesting client device generates the scrambling control word for descrambling the scrambled media content, based on the proxy data and the cryptographic data.

In the non-blind scenario described above, it is required that the CCS have access to un-scrambled content if the CSS performs transformations on content. Such transformation may include the transcode/transrate/transformat/etc. operations as well as other transformations including but not limited to:

applying a graphical overlay
applying a watermark onto video, audio, text re-formatting text to fit the CC capabilities (as in a electronic book)
converting text to audio (for the visually impaired)
converting audio standards (for example 5.1 to Mono).
converting subtitle or closed captioning to audio (for the visually Impaired)
converting Audio to text for hearing impaired.

In one embodiment of an RSA-based "Blind Server" sanction methods can be illustrated in conjunction with the example that follows where a cryptographic client (CC), cryptographic caching server (CCS) and cryptographic sanctioning authority are implemented via (CSA) sanction server 200, caching server 210 and clients 240 and 242 and the content owner (CO) is implemented via content source 220.

1. The CO authenticates the CCS and the CSA and generates a random number $CW=RN1$ where $CW=\{0,1,2,\ldots,n-1\}$ Given (U, V) such that $(X^U \bmod n)^V \bmod n = X$, the CO generates cryptographic data as $A = CW^u \bmod n$ Where, Scrambled Content=$S$(content, $CW$)

The CO then forwards $\{A, S(\text{content}, CW)\}$ to the CCS and the proxy data $\{V, n\}$ to the CSA. The CCS caches the cryptographic data A and the Scrambled Content, the CSA caches the proxy data $\{V, n\}$.
2. The CC requests content from CSA.
3. The CSA authenticates the CC and then forwards the proxy data $\{V, n\}$ to the CC and forwards notification data to the CCS that the CC has requested particular content.
4. The CCS then forwards the cryptographic data A and the S(content, CW) to the CC.
5. The CC calculates the control word based on the cryptographic data and the proxy data as follows:

$CW = A^V \bmod n$

The CC may then descrambles the scrambled content (i.e. S(Content, CW)).

The CC calculations result in the same CW value and this value may now be used as the CW to de-scramble the content sent from the CCS to the CC. In this blind server case the CCS and the CSA are never able to calculate the CW and only have access to scrambled content and so they are never able to disclose the content. In this relationship the CSA does not participate in the actual transfer of content from the CS to the CC but the operation cannot proceed without the knowledge and participation of the CSA (i.e. the CSA must sanction the exchange).

In one embodiment of an ECC-based Blind Server sanction methods can be illustrated in conjunction with the example that follows where a cryptographic client (CC), cryptographic caching server (CCS) and cryptographic sanctioning authority are implemented via (CSA) sanction server 200, caching server 210 and clients 240 and 242 and the content owner (CO) is implemented via content source 220.

1. The CO authenticates the CCS and the CSA and generates the random numbers $A=RN1$ where $A=\{0,1,2,\ldots,n-1\}$ $B=RN2$ where $B=\{0,1,2,\ldots,n-1\}$ The CO generates cryptographic data as $K(x,y) = B\ G(x,y)$ $CW = A\ B\ G(x,y)$ Where, Scrambled Content=$S$(content, $CW$)

The CO then forwards $\{\{K(x,y)\}, S(\text{content}, CW)\}$ to the CCS and the proxy data $\{A, n\}$ to the CSA. The CCS caches the cryptographic data $\{K(x,y)\}$ and the Scrambled Content, the CSA caches the proxy data $\{A, n\}$.
2. The CC requests content from CSA.
3. The CSA authenticates the CC and then forwards the proxy data $\{A, n\}$ to the CC and forwards notification data to the CCS that the CC has requested particular content.
4. The CCS then forwards the cryptographic data $\{K(x,y)\}$ and the S(content, CW) to the CC.
5. The CC calculates the control word CW based on the cryptographic data and the proxy data as follows:

$CW = A\ K(x,y)$

6. The CC may then descrambles the scrambled content (i.e. S(Content, CW)).

As in the prior examples, the CC calculations result in the same CW value and this value may now be used as the CW to de-scramble the content sent from the CCS to the CC. In this blind server case the CCS and the CSA are never able to calculate the CW and only have access to scrambled content and so they are never able to disclose the content. In this relationship the CSA does not participate in the actual transfer of content from the CCS to the CC but the operation cannot proceed without the knowledge and participation of the CSA (i.e. the CSA must sanction the exchange).

In any of the examples above, the sanction server 200 can implement a revocation to disable a device (a CC or CS) which has been compromised. This revocation includes first identifying the specific device which has been compromised and then discontinuing issuing further sanctions associated with the device. For example, every transaction may be monitored by the cryptographic sanctioning authority (CSA) and as soon as a compromised device is identified, via either an authentication failure, notice from a content owner or other methods, that device can be rejected from performing any further transactions. This revocation process can be particularly effective because the sanctioning process is centralized to the CSA and does not necessarily rely on distribution of revocation lists like other systems.

In one mode of operation, the CSA can simply reject any request from a CCS or CC which has been identified as being compromised in which case no further transaction may be completed. In the blind server mode of operation, the CO has the option to calculate and distribute new CW's and to scramble content using the new CW. This is effective in that old content would not be scrambled with the new CW and new CW's would not be able to descramble old content. In effect this creates a method to renew the CW's used to secure content which may be desirable to be done on a regular basis.

It should also be noted that some content may have associated rights (for example copy once, copy never, copy free, etc.) which are carried along with the content and the content owner relies on the integrity of the various parties to respect and enforce these rights. By use of cryptographic sanctioning methods the content owner can more closely track and enforce ownership rights with respect to the content via constraints on the cryptographic sanctioning authority (particularly in the blind server case) because transactions are centralized to the CSA. In this way, cryptographic sanctioning methods are useful for extending the range and effectiveness of rights management in the content delivery system 10.

One advantage to separating the CO and CSA (via the proxy method) is that the CO does not have to be online all the time. This reduces the burden on the SO where as the CSA may be an automated server that is online 24/7.

Figure 3:
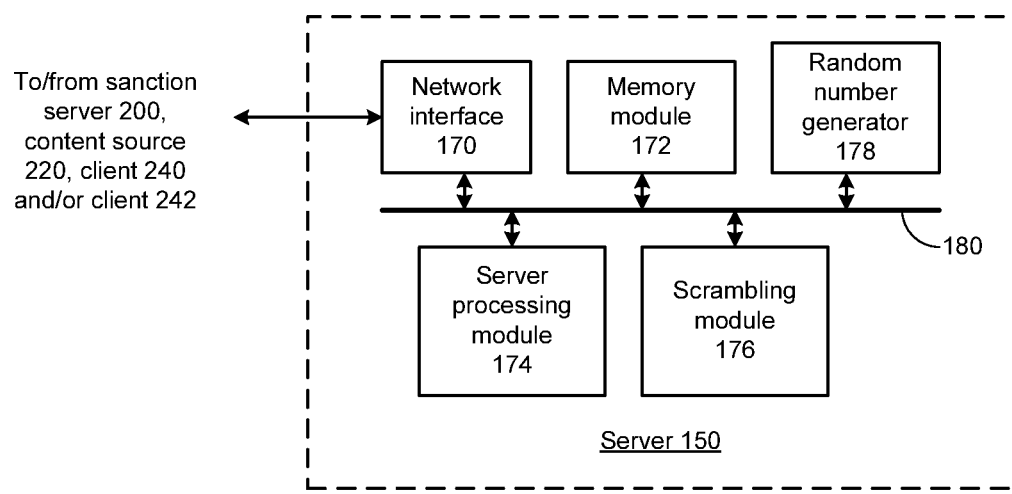
FIG. 3 presents a block diagram representation of a server 150 in accordance with an embodiment of the present invention.

FIG. 3 presents a block diagram representation of a server 150 in accordance with an embodiment of the present invention. In particular, a server 150 is shown, such as caching server 210 of FIG. 1. In particular, server 150 includes a network interface 170, such as a network card, modem or other device that that provides bidirectional data communication at least one network of cloud 25. The server 150 includes a server processing module 174, memory module 172, scrambling module 176 and a random number generator 178 that are connected via data bus 180. While random number generator 178 and scrambling module 176 are shown as separate devices, each can optionally be implemented in software or firmware stored in memory module 172 and executed by a processor such as server processing module 174 or other processor.

The server processing module 174 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 172. Memory module 172 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

The specific content cached in the caching server can be stored in memory module 172. While described above in terms of local storage, the memory module 172 can include network attached storage, a storage area network, a virtual file system or other storage of content within the cloud computing topology 25.

In one mode of operation, the network interface 170 receives first sanction data and the notification data from a sanction server 200. The random number generator 178 generates a random number. The server processing module 174, generates first cryptographic data based on the first sanction data and based on a random number generated by random number generator 178 and sends the first cryptographic data to the requesting client device 240 or 242 via the network interface 170. The requesting client device 240 or 242 generates second cryptographic data based on the first sanction data and reciprocates by sending the second cryptographic data to the caching server 210 that is received via network interface 170. The server processing module 174 generates a scrambling control word based on the first sanction data and the second cryptographic data, and the scrambling module 176 scrambles the media content using this control word. The scrambled media content is sent to the requesting client device 240 or 242. The requesting client device 240 or 242 independently generates the scrambling control word based on the second sanction data and the first cryptographic data and descrambles the media content using the scrambling control word.

In another mode of operation, the network interface 170 of sanction server 150 receives cryptographic data and the scrambled media content from the content source 220. The network interface forwards the cryptographic data and the scrambled media content to the requesting client device 240 or 242 in response to the receipt of notification data from the sanction server 200 that the client device authenticated. The requesting client device generates the scrambling control word for descrambling the scrambled media content based on the proxy data and the cryptographic data.

Sanctions may be classed as either "Persistent" or "Non-Persistent". In an example of the Persistent case, a user purchases a player application from an online store. The first time he runs the application, the online store detects the CCS then issues request to the CSA. The CSA issues the sanction and so the CCS and CC negotiate a CW. In this case the CW would become the pairing key to be used persistently from now on by the CC and CS. This is the typical scenario where the CCS is installed in a home and a user is entitled to use a particular portable device to stream content from a particular CCS.

In an example of the Non-Persistent case, a user may roam and connect to different CCS devices intermittently. In this case the CSA issues the sanction and the negotiated CW may be used only for the duration of the session (i.e. until the CC disconnects from the CS). This is the scenario where a user might want to connect to a CCS installed in a public place (like an airport or a coffee shop). There is also the scenario where the CSA may want to track every session and in this case the sanctioning transaction would be required for every session. The Non-Persistent case is more cumbersome than the persistent scenario but may be advantageous for the CSA and CO to track content more closely.

Figure 4:
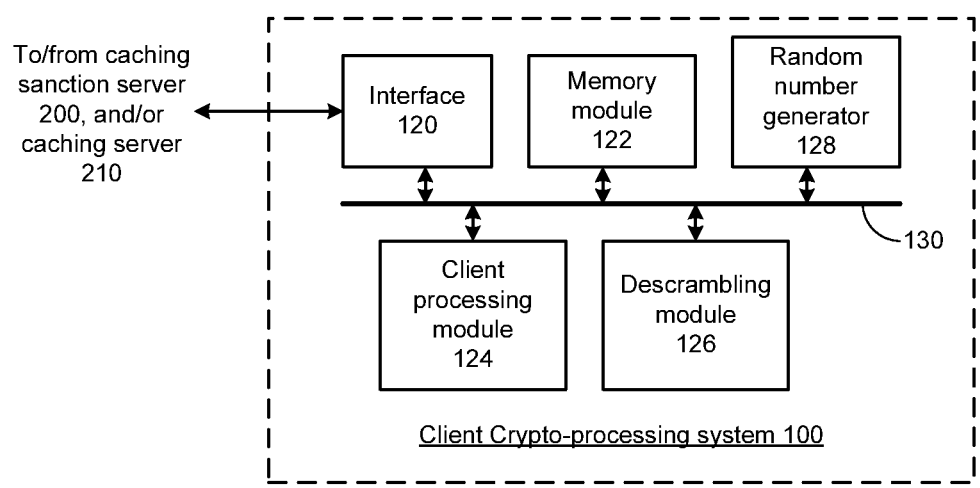
FIG. 4 presents a block diagram representation of a client crypto-processing system 100 in accordance with an embodiment of the present invention.

FIG. 4 presents a block diagram representation of a client crypto-processing system 100 in accordance with an embodiment of the present invention. In particular, a client crypto-processing system 100 is shown for use in a client device, such as client 240 or 242 of FIG. 1. Client crypto-processing system 100 includes an interface 120 that operates as a network interface or that interfaces with a network interface such as a network card, modem or other device that that provides bidirectional data communication at least one network of cloud 25 for the client device 240 or 242. The crypto-processing system 100 includes a client processing module 124, memory module 122, descrambling module 126 and a random number generator 128 that are connected via data bus 130. While random number generator 128 and descrambling module 126 are shown as separate devices, each can optionally be implemented in software or firmware stored in memory module 122 and executed by a processor such as client processing module 124 or other processor.

The client processing module 124 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 122. Memory module 122 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

In one mode of operation, the interface 120 transmits a request for content to the sanction server 200 and receives second sanction data from the sanction server 200 and first cryptographic data from the caching server 210. The client processing module 124 generates second cryptographic data based on the first sanction data and also based on a random number generated by random number generator 128 and reciprocates by sending the second cryptographic data to the caching server 210 via the interface 120. The interface 120 receives the scrambled content from the caching server 210. The client processing module 124 independently generates the scrambling control word based on the second sanction data and the first cryptographic data and the descrambling module 126 descrambles the scrambled media content using the scrambling control word.

In another mode of operation, the interface 120 transmits a request for content to the sanction server 200 and receives proxy data from the sanction server 200 and the cryptographic data and the scrambled media content from the caching server 210. The client processing module 124 generates the scrambling control word for descrambling the scrambled media content based on the proxy data and the cryptographic data.

Figure 5:
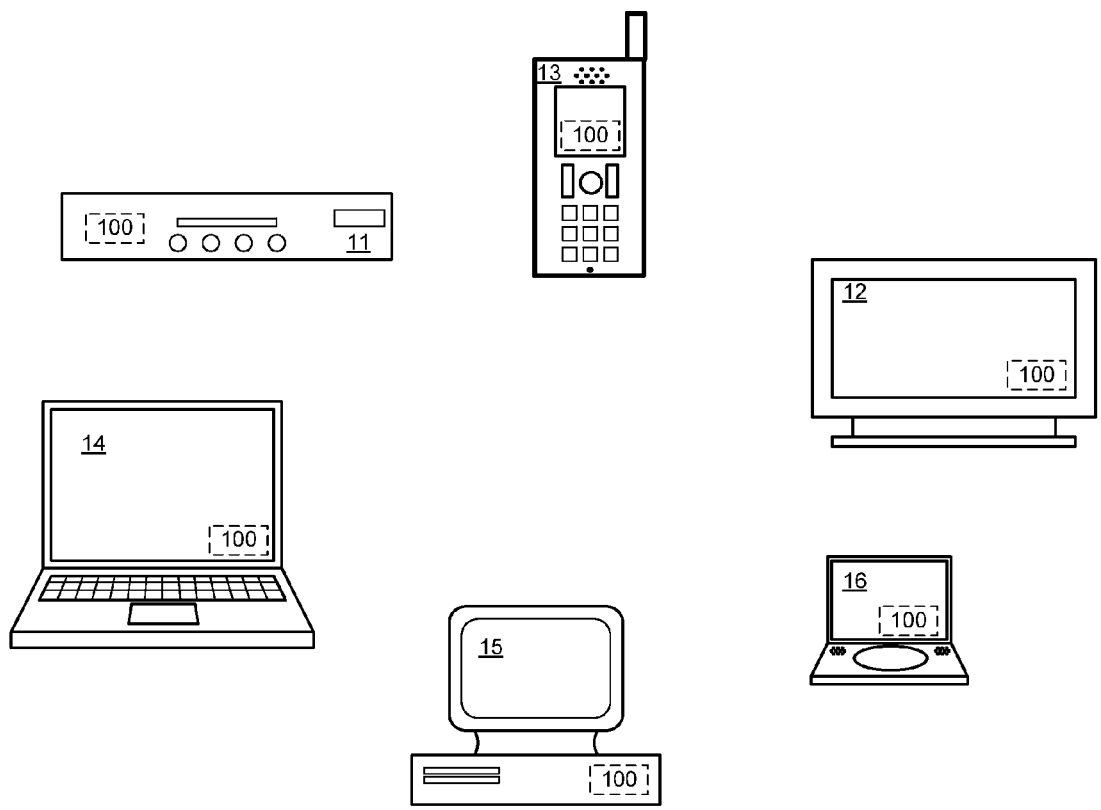
FIG. 5 presents a pictorial representation of example devices 11-16 that can include a client crypto-processing system 100 in accordance with an embodiment of the present invention.

FIG. 5 presents a pictorial representation of example devices 11-16 that can include a client crypto-processing system 100 in accordance with an embodiment of the present invention. In particular, these example devices include digital video recorder/set top box 11, television or monitor 12, wireless telephony device 13, computers 14 and 15, personal video player 16, or other devices that include a crypto-processing system 100.

While crypto-processing system 100 is shown as being integrated in each of the devices 11-16, in an alternative embodiment of the present invention, crypto-processing system 100 can be coupled to one or more of these host devices via a host interface. In particular, crypto-processing system 100 can take on any one of a number of form factors such as a PC card, memory card, personal computer memory card international association (PCMCIA) card, universal serial bus (USB) dongle or other device that is coupleable to one or more host devices via an Ethernet connection, a memory card interface, USB connection, Firewire (IEEE 1394) connection, small computer system interface (SCSI), PCMCIA interface, or other interface either standard or proprietary or that is incorporated into the device 11-16.

Figure 6:
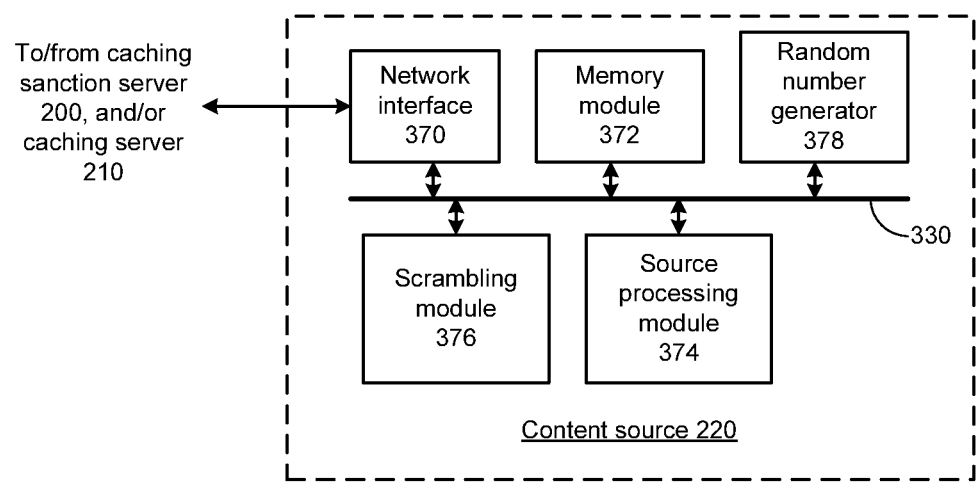
FIG. 6 presents a block diagram representation of a content source 220 in accordance with an embodiment of the present invention.

FIG. 6 presents a block diagram representation of a content source 220 in accordance with an embodiment of the present invention. Content source 220 includes a network interface 370, such as a network card, modem or other device that that provides bidirectional data communication at least one network of cloud 25. The content source 220 includes a source processing module 374, memory module 372, scrambling module 376 and a random number generator 378 that are connected via data bus 380. While random number generator 378 and scrambling module 376 are shown as separate devices, they can optionally be implemented in software or firmware stored in memory module 372 and executed by a processor such as source processing module 374 or other processor.

The processing module 374 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 372. Memory module 372 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown, alternative architectures using direct connectivity between one or more modules and/or additional buses can likewise be implemented in accordance with the present invention.

The specific content stored in the caching server can be stored in memory module 372. While described above in terms of local storage, the memory module 372 can include network attached storage, a storage area network, a virtual file system or other storage of content, either inside or separate from, the cloud computing topology 25. In one mode of operation, the content stored in content source 220 is provided to one or more caching servers 210 to be sanctioned independently of the content source 220.

In the blind server mode of operation previously described, the content source 220 plays a more central role in the sanctioning process. In this scenario, the content is pre-scrambled by the scrambling module 376 before it is released to the CS, the cryptographic sanctioning authority is provided with the content source's proxy in the form of proxy data (i.e. information which allows the Sanctioning Authority to operate but not sufficient to derive the CW). The proxy data may also include information with respect to the distribution rights associated with the content, i.e. it may identify "who or what device or devices" are permitted to access the content and/or any restrictions which are to be imposed on CC's with respect to the content. Only the content source 220 has access to the CW and clear content.

In an embodiment of the present invention, the source processing module 374 generates proxy data based a random number generated by random number generator 378. The proxy data includes cryptographic parameters that are based on a scrambling control word used to scramble the media content. The proxy data are sent to the sanction server 200 via network interface 370. In response to a request for the media content from a client device 240 or 242, the sanction processing module 324 generates notification data that indicates the requesting client device 240 or 242 and the requested media content. The network interface 320 transmits the proxy data to the requesting client device 240 or 242 and transmits notification data to the caching server 210. The source processing module generates cryptographic data based a random number generated by random number generator 378 and sends the cryptographic data and the scrambled media content to the caching server 210. The caching server 210 forwards the cryptographic data and the scrambled media content to the requesting client device 240 or 242. The requesting client device generates the scrambling control word for descrambling the scrambled media content based on the proxy data and the cryptographic data.

Figure 7:
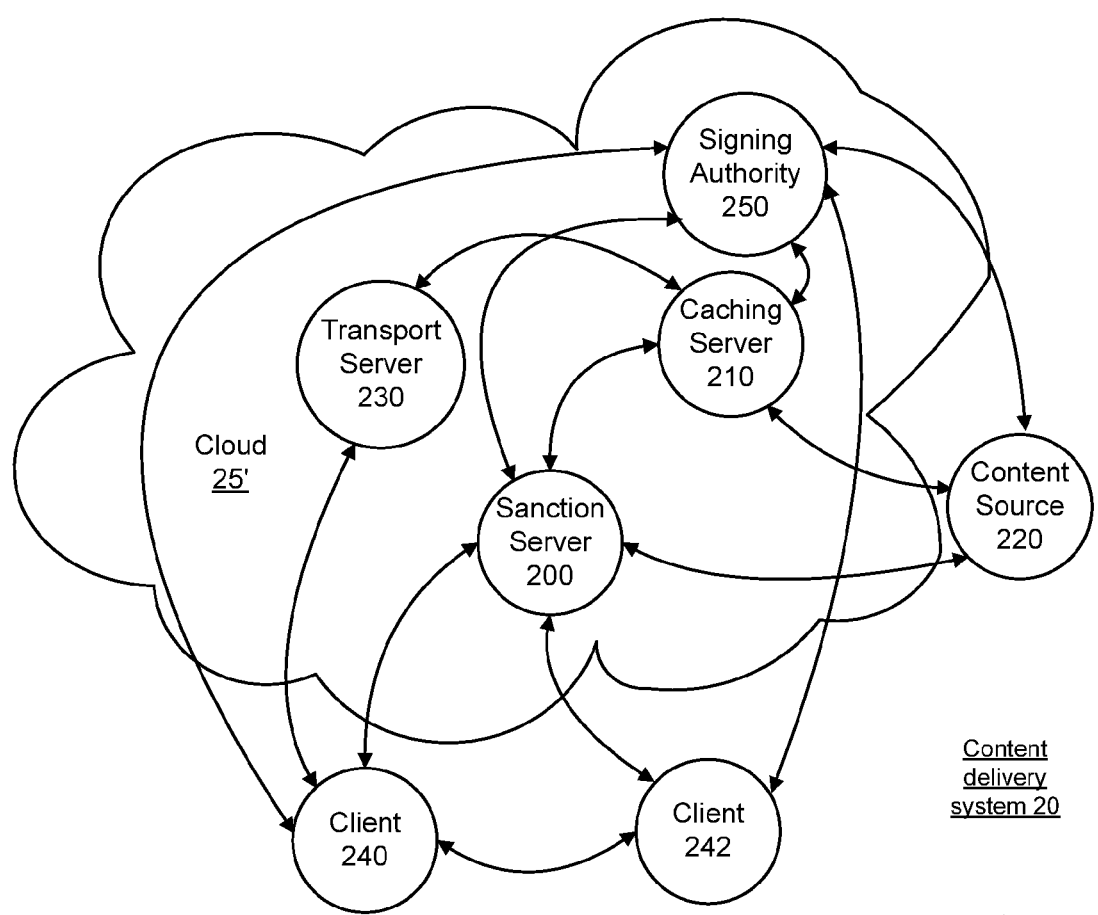
FIG. 7 presents a data flow diagram representation of a content delivery system 20 in accordance with another embodiment of the present invention.

FIG. 7 presents a data flow diagram representation of a content delivery system 20 in accordance with another embodiment of the present invention. In particular, a content delivery system 20 is shown that is similar to, and includes many common elements of content delivery system 10 that are referred to by common reference numerals. In this embodiment, the content delivery system includes a signing authority 250, as part of the cloud computing topology 25' for facilitating the authentication of different aspects of content transfers. Cloud computing topology 25' operates as cloud computing topology 25 in all other ways.

In this embodiment, entities participating in a transaction are issued certificates from signing authority 250 which includes certificate data such as a unique identifier (ID) and a public key, an entitlement (i.e. defines the role or privileges of the entity) and also a private key which is kept secret. The certificate is included and/or used to authenticate any or all transactions and to identify the parties to the transactions to one another, i.e. to guarantee that only authorized parties are involved in the exchange of data.

Generally, the sanction server 200, server 150, such as caching server 210, content source 220, and clients 240 and 242 each store issued certificate data in their respective memory modules and process authentication requests via their respective processing modules in order to authenticate the other parties to a particular transaction and corresponding data received therefrom. For example, the sanction processing module 324 of sanction server 200 authenticates the request for the media content from a requesting client device 240 or 242 and signs the first sanction data and the second sanction data based on certificate data from the signing authority.

In this fashion, each of the prior configurations the cryptographic sanction operations between the CO, CSA, CC and/or CCS may be further secured by requiring that all parties perform a certificate exchange and validation as part of the protocol which allows transaction to be sanctioned. In particular, when a client (CC) requests content from the sanctioning authority (CSA), the client (CC) can include its certificate as part of the request. Certificates exchange may similarly be required between the CSA and the CCS as well as between the CCS and CC. When a certificate is received the certificate is authenticated, i.e. the certificate is checked to verify that it is formatted correctly and has been signed by a valid signing authority 250. Also a random value encrypted using the sender's private key is verified using the public key within the certificate. Mutual authentication may also be used by the sender to authenticate the receiver's certificate. If the certificates are determined to be invalid then the transaction is rejected. Likewise, when forwarding information to a recipient, the information can be encrypted using the public key within a certificate. Only the designated recipient that holds the corresponding private key can decrypt the information. Furthermore, when otherwise sending a message to a recipient, the message can include the information necessary to identify and authenticate the parties involved in the sanction operation. This typically includes all certificates, device addresses, etc. which are required to support the request, authentication, forwarding or other messages. This information itself may also be encrypted (to further secure this link) using the recipient's public key as a certificate exchange had previously occurred.

Figure 8:
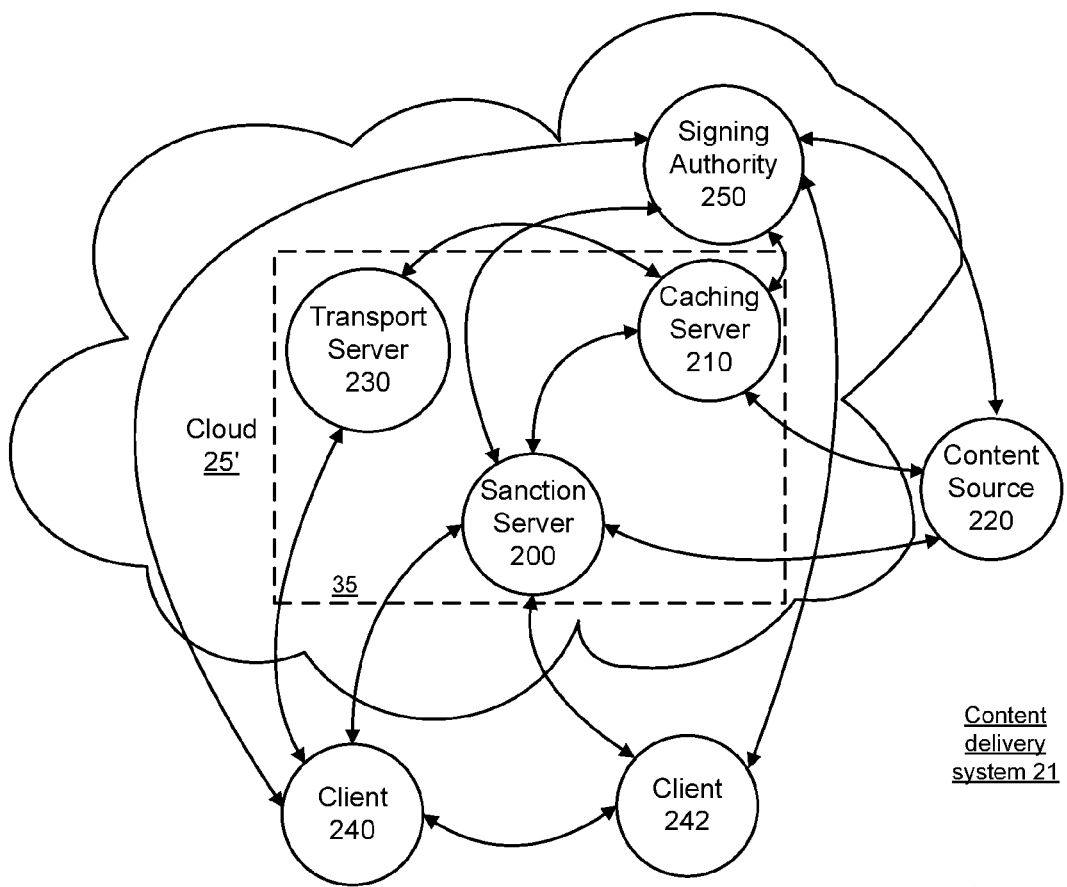
FIG. 8 presents a data flow diagram representation of a content delivery system 21 in accordance with another embodiment of the present invention.

FIG. 8 presents a data flow diagram representation of a content delivery system 21 in accordance with another embodiment of the present invention. In particular, a content delivery system 21 is shown that is similar to, and includes many common elements of content delivery system 20 that are referred to by common reference numerals. In this embodiment, a broadcaster 35 plays the role of CS, TS and CSA. In this scenario the broadcaster is typically not blind, but could be blind, based on the credentials and implementation of the broadcaster 35. While the sanction server 200, transport server 230 and caching server 210 are shown as separate devices with communication in-between each device, the functionality of two or more of these devices can be combined portions of the communication between these devices could be eliminated. In particular, the caching server 210 and sanction server can be combined. In this fashion, the cashing server 210 need not be authenticated to or sanctioned by the sanction server 200, eliminating the need, for example, the caching server 210 to independently generate the control word.

Figure 9:
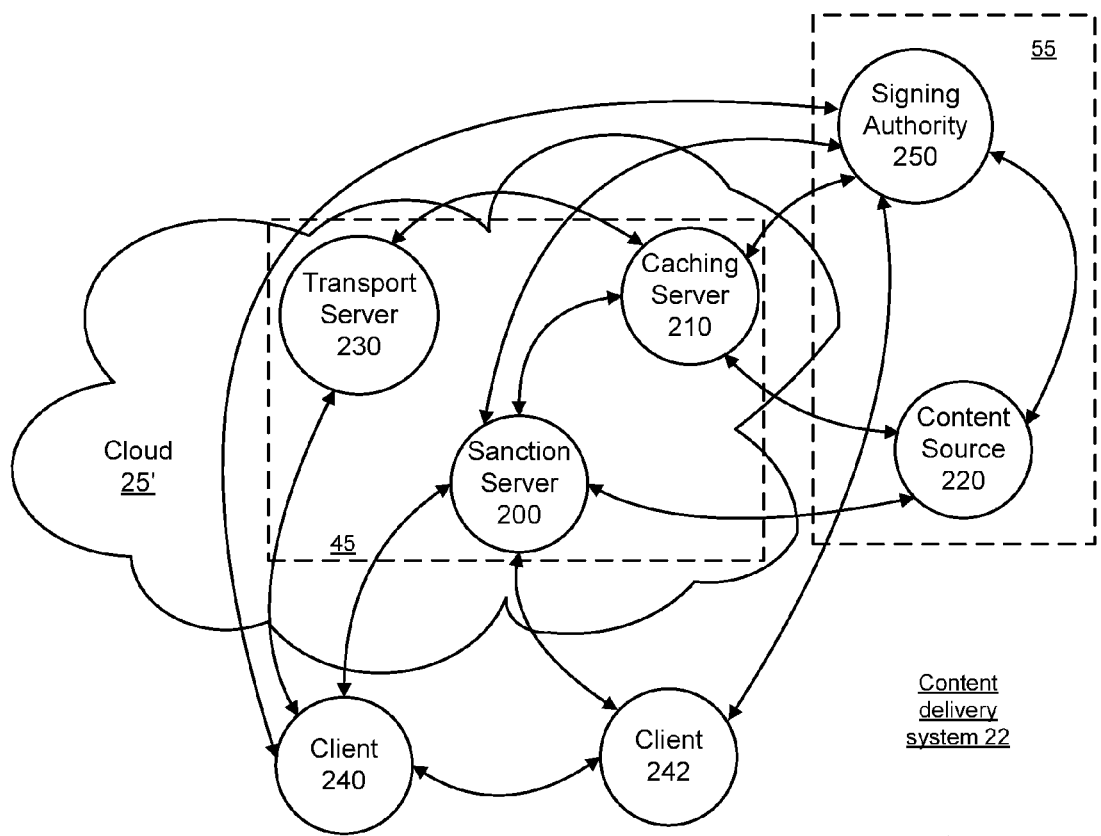
FIG. 9 presents a data flow diagram representation of a content delivery system 22 in accordance with another embodiment of the present invention.

FIG. 9 presents a data flow diagram representation of a content delivery system 22 in accordance with another embodiment of the present invention. In particular, a content delivery system 22 is shown that is similar to, and includes many common elements of content delivery system 20 that are referred to by common reference numerals. In this embodiment, an online content store 45 plays the roles of sanction server 200, caching server 210 and transport 230 and a content owner 55 provides the role of both the content source 220 and the signing authority 250. In this example the content owner 55 might encrypt the content and the online store 45 could operate as a blind server. While the sanction server 200, transport server 230 and caching server 210 are shown as separate devices with communication in-between each device, the functionality of two or more of these devices can be combined portions of the communication between these devices could be eliminated.

Figure 10:
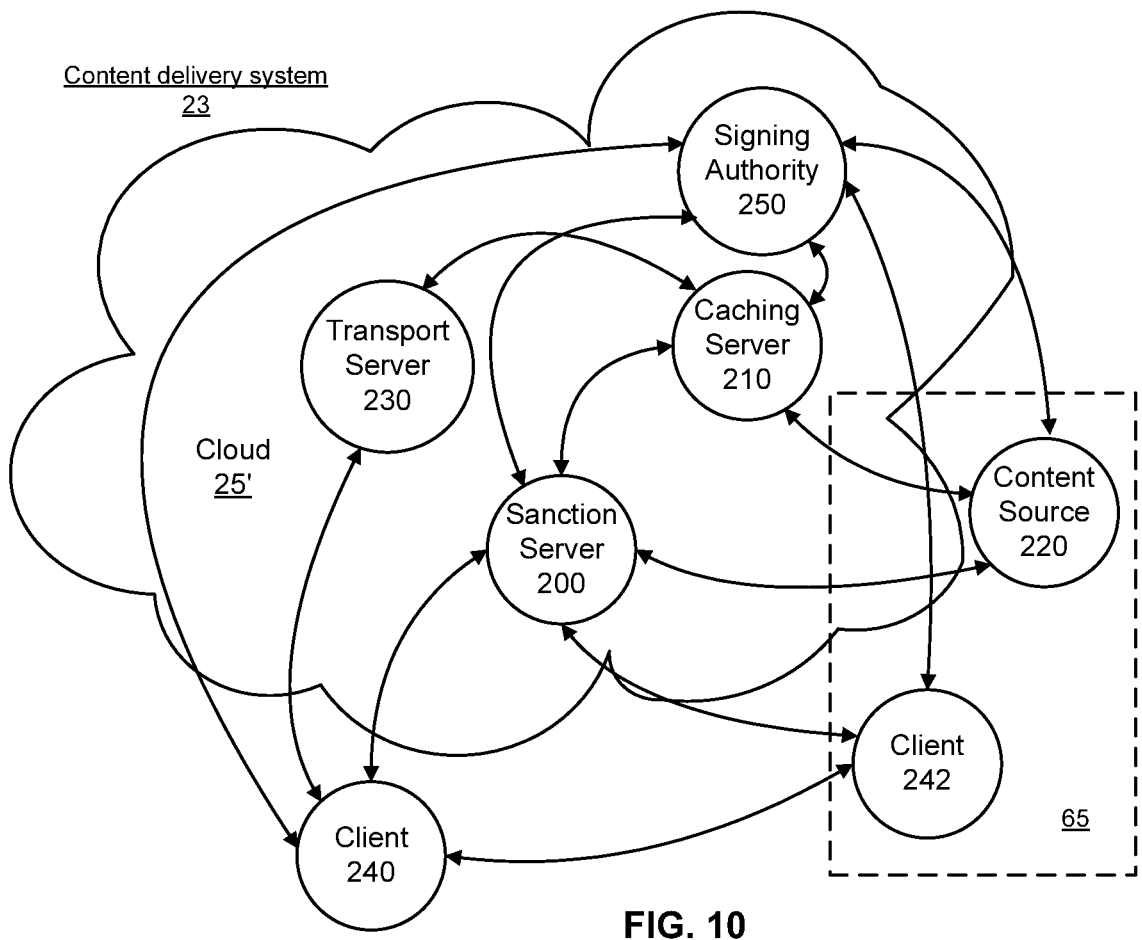
FIG. 10 presents a data flow diagram representation of a content delivery system 23 in accordance with another embodiment of the present invention.

FIG. 10 presents a data flow diagram representation of a content delivery system 23 in accordance with another embodiment of the present invention. In particular, a content delivery system 23 is shown that is similar to, and includes many common elements of content delivery system 20 that are referred to by common reference numerals. In this embodiment, the client 65 provides the roles of both client 242 and content source 220 for the client's content. The content of client 65 can be cached in the cloud 25' with the sanction server 200 providing controlled access to other clients, such as client 240. In this case the CSA is operating as a proxy for the content source 220 who happens to be a client 242. The caching server 210 can be operated as either a blind server or non-blind server.

Figure 11:
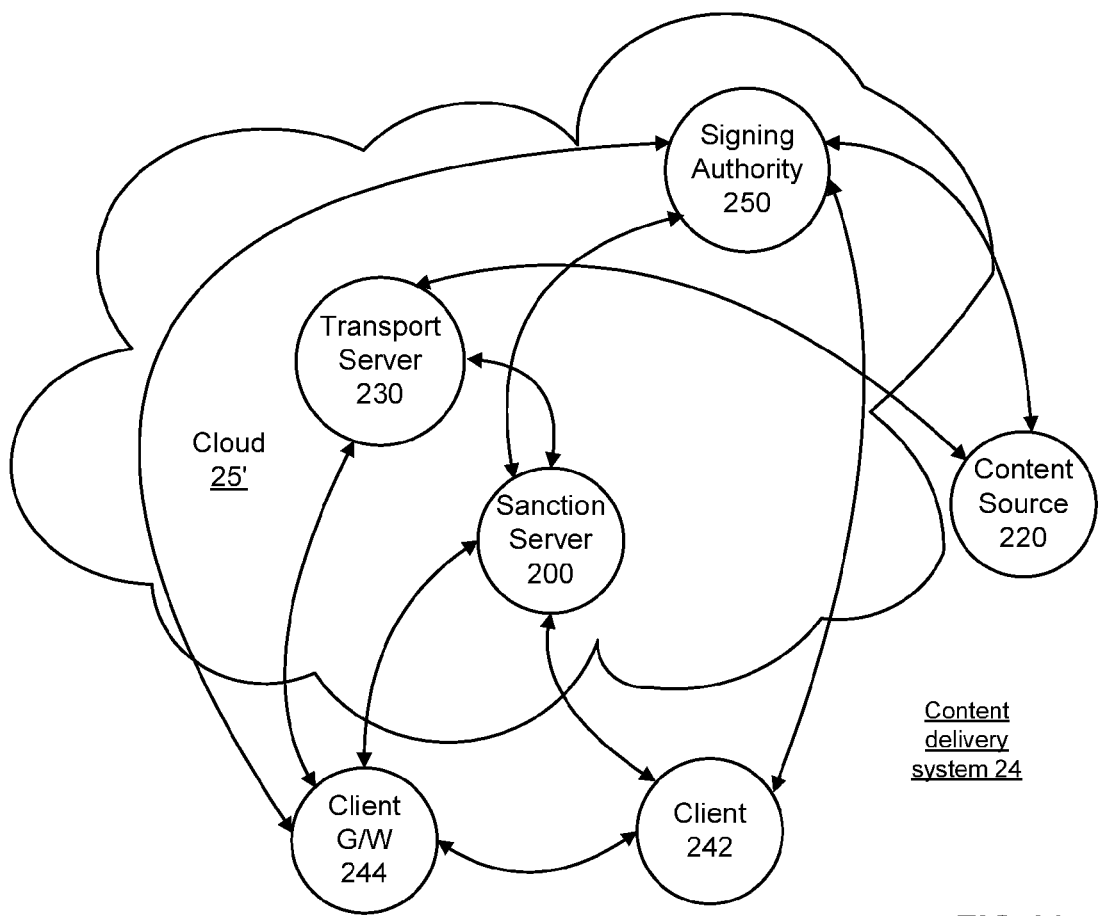
FIG. 11 presents a data flow diagram representation of a content delivery system 24 in accordance with another embodiment of the present invention.

FIG. 11 presents a data flow diagram representation of a content delivery system 24 in accordance with another embodiment of the present invention. In particular, a content delivery system 24 is shown that is similar to, and includes many common elements of content delivery system 20 that are referred to by common reference numerals. In this embodiment, client gateway 244 caches content received from the cloud 25' and the sanction server 200 is providing controlled access to separate other clients. In this case the client gateway 244 also operates as a caching server with respect to another client 242. In this case, the client gateway 244 is optionally not operating as a blind server because it may have transcode the content for either transmission to client 242 or to implement digital video recorder time shifting functionality which requires access to clear content. However the content streamed to the client 242 can still be scrambled if the connection between clients is not otherwise secure. In addition, the content is transferred to the client gateway 244 can also be secured using traditional techniques.

While several implementation scenarios have been discussed in conjunction with FIGS. 1-11, there are many more possible scenarios which are logical extensions of the above which may make use of cryptographic sanctioning methods described herein. Typically these scenarios involve one or more parties which take on one or more cryptographic roles in various combinations and permutations but the feature which makes them new and innovative is that they use sanctioning methods to achieve secure content delivery among multiple parties. Note also that there are variations on the mathematical methods presented in this patent which could be used to achieve the similar cryptographic sanctioning operations (i.e. the concept of a cryptographic sanctioning is not restricted to the particular mathematical methods presented).

Figure 12:
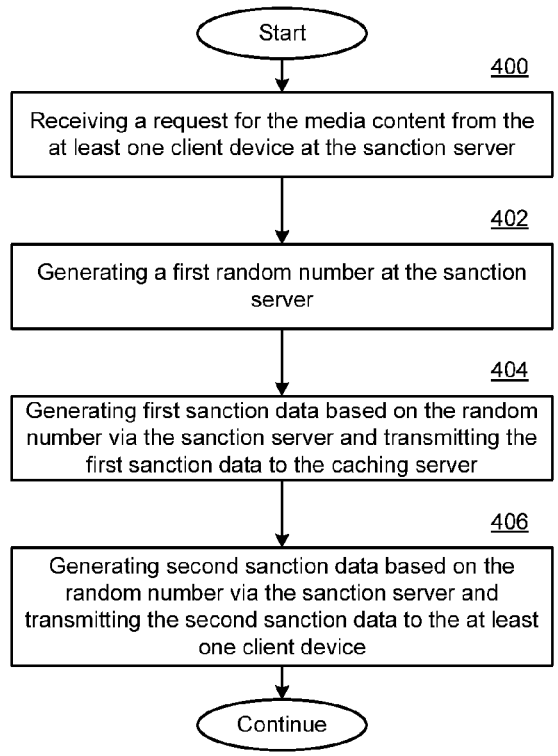
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more functions and features described in conjunction with FIGS. 1-11. In step 400, a request for the media content is received from at least one client device at a sanction server. In step 402, a first random number is generated at the sanction server. In step 404, first sanction data is generated based on the random number via the sanction server and transmitting the first sanction data to the caching server. In step 406, the second sanction data is generated based on the random number via the sanctioning server and transmitting to at least one client device.

In an embodiment of the present invention, the caching server generates first cryptographic data based on the first sanction data and sends the first cryptographic data to at least one client device. At least one client device generates second cryptographic data based on the first sanction data and sends the second cryptographic data to the caching server. The caching server generates a scrambling control word for scrambling the media content based on the first sanction data and the second cryptographic data. Further, at least one client device generates the scrambling control word for descrambling the media content based on the second sanction data and the first cryptographic data.

The first sanction data, the second sanction data, the first cryptographic data and the second cryptographic data can be generated in accordance with a Rivest, Shamir, Adelman (RSA) cryptography algorithm, an elliptic curve cryptography algorithm, or other cryptography algorithm.

Figure 13:
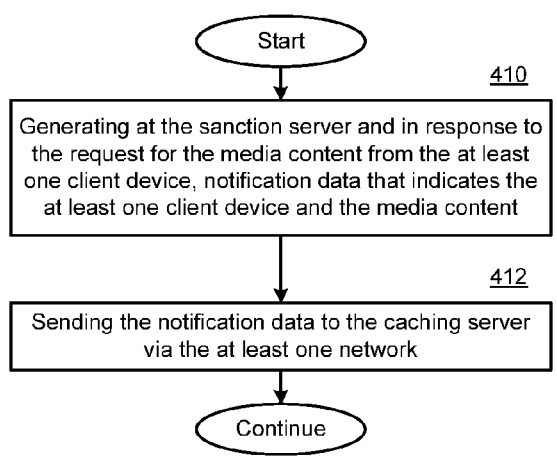
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more functions and features described in conjunction with FIGS. 1-11. Step 410 includes generating, at the sanction server and in response to the request for the media content from at least one client device, notification data that indicates at least one client device and the media content. Step 412 includes sending the notification data to the caching server via at least one network.

Figure 14:
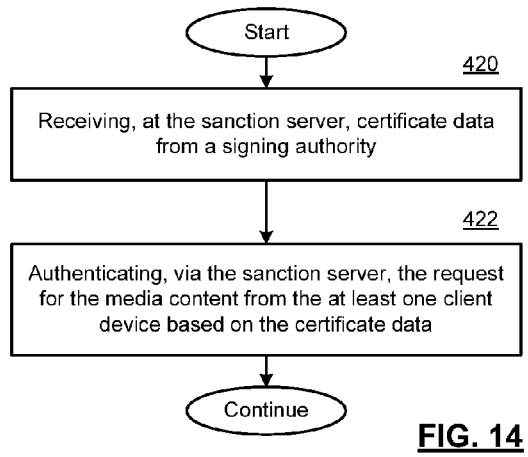
FIG. 14 presents a flowchart representation of a method in accordance with an embodiment of the present invention.

FIG. 14 presents a flowchart representation of a method in accordance with an embodiment of the present invention. In particular, a method is presented for use in conjunction with one or more functions and features described in conjunction with FIGS. 1-11. Step 420 includes receiving, at the sanction server, certificate data from a signing authority. Step 422 includes authenticating, via the sanction server, the request for the media content from at least one client device based on the certificate data.

Figure 15:
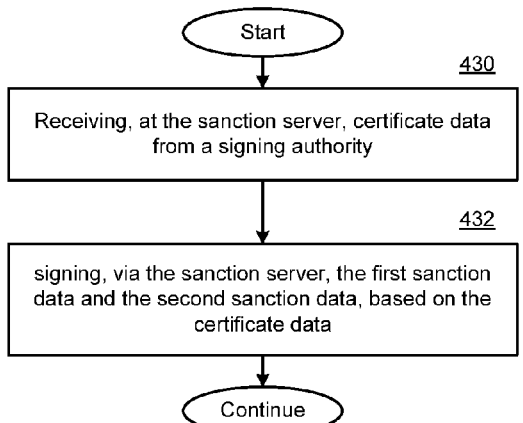
FIG. 15 presents a flowchart representation of a method in accordance with an embodiment of the present invention.

FIG. 15 presents a flowchart representation of a method in accordance with an embodiment of the present invention. In particular, a method is presented for use in conjunction with one or more functions and features described in conjunction with FIGS. 1-11. Step 430 includes receiving, at the sanction server, certificate data from a signing authority. Step 432 includes signing, via the sanction server, the first sanction data and the second sanction data based on the certificate data.

Figure 16:
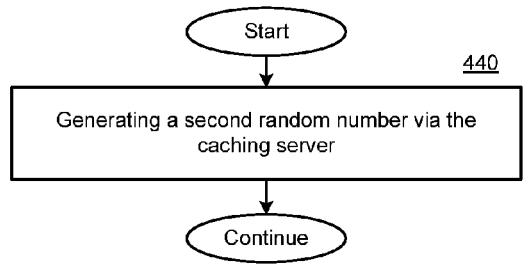
FIG. 16 presents a flowchart representation of a method in accordance with an embodiment of the present invention.

FIG. 16 presents a flowchart representation of a method in accordance with an embodiment of the present invention. In particular, a method is presented for use in conjunction with one or more functions and features described in conjunction with FIGS. 1-11. In step 440, a second random number via the caching server. The first cryptographic data can be generated at the caching server, further based on the second random number.

Figure 17:
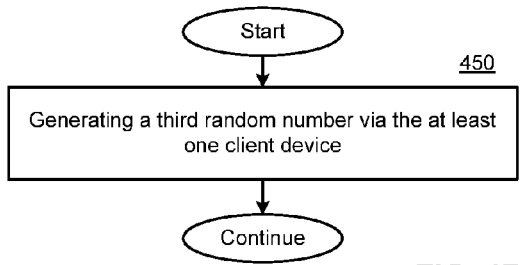
FIG. 17 presents a flowchart representation of a method in accordance with an embodiment of the present invention.

FIG. 17 presents a flowchart representation of a method in accordance with an embodiment of the present invention. In particular, a method is presented for use in conjunction with one or more functions and features described in conjunction with FIGS. 1-11. In step 450, a third random number is generated via at least one client device. The second cryptographic data can be generated at least one client device, further based on the third random number.

Figure 18:
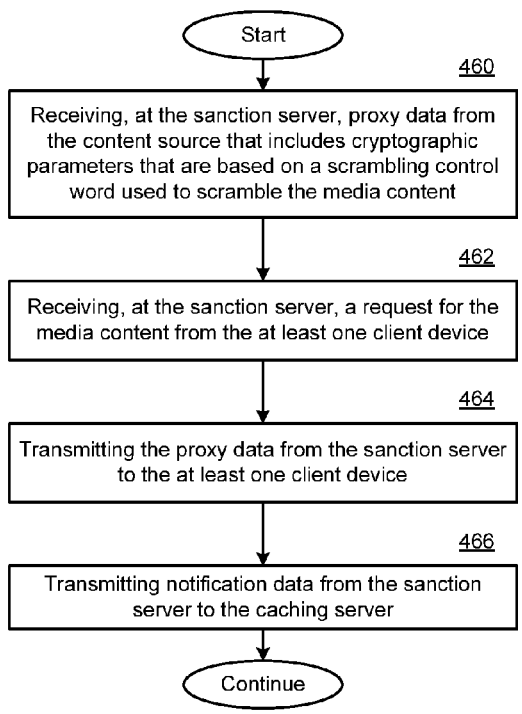
FIG. 18 presents a flowchart representation of a method in accordance with an embodiment of the present invention.

FIG. 18 presents a flowchart representation of a method in accordance with an embodiment of the present invention. In particular, a method is presented for use in conjunction with one or more functions and features described in conjunction with FIGS. 1-11. Step 460 includes receiving, at the sanction server, proxy data from the content source that includes cryptographic parameters that are based on a scrambling control word used to scramble the media content. Step 462 includes receiving, at the sanction server, a request for the media content from at least one client device. Step 464 includes, transmitting the proxy data from the sanction server to at least one client device. In step 464, notification data is transmitted from the sanction server to the caching server.

In an embodiment of the present invention, the content source generates cryptographic data and sends the cryptographic data and the scrambled media content to the caching server. The caching server forwards the cryptographic data and the scrambled media content to at least one client device. At least one client device generates the scrambling control word for descrambling the scrambled media content based on the proxy data and the cryptographic data. The proxy data and the cryptographic data can be generated in accordance with a Rivest, Shamir, Adelman (RSA) cryptography algorithm, an elliptic curve cryptography algorithm, or other cryptography algorithm.

Figure 19:
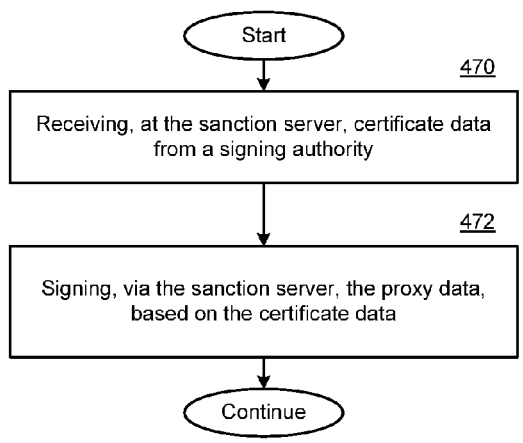
FIG. 19 presents a flowchart representation of a method in accordance with an embodiment of the present invention.

FIG. 19 presents a flowchart representation of a method in accordance with an embodiment of the present invention. In particular, a method is presented for use in conjunction with one or more functions and features described in conjunction with FIGS. 1-11. Step 470 includes receiving, at the sanction server, certificate data from a signing authority. Step 472 includes signing, via the sanction server, the proxy data based on the certificate data.

Figure 20:
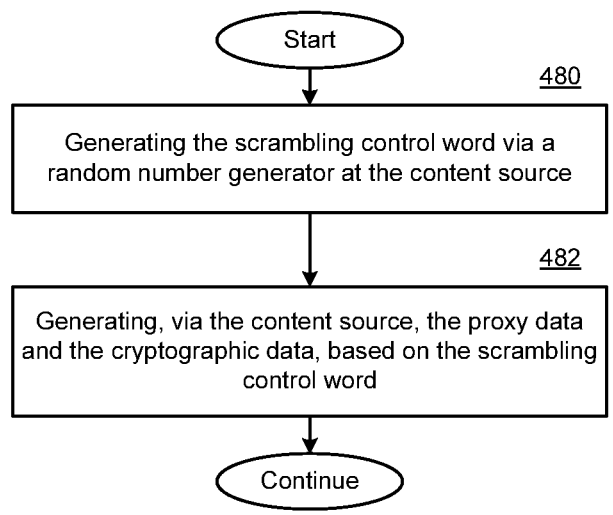
FIG. 20 presents a flowchart representation of a method in accordance with an embodiment of the present invention.

FIG. 20 presents a flowchart representation of a method in accordance with an embodiment of the present invention. In particular, a method is presented for use in conjunction with one or more functions and features described in conjunction with FIGS. 1-11. In step 480, the scrambling control word is generated via a random number generator at the content source. In step 482, the proxy data and the cryptographic data are generated based on the scrambling control word.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a content delivery system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A sanction server for cryptographic sanctioning of secure transmission of media content from a caching server to at least one client device, the sanction server comprising:
   a network interface that provides bidirectional data communication with the caching server and the at least one client device via at least one network, wherein the network interface receives a request for the media content from the at least one client device and transmits first sanction data to the caching server and second sanction data to the at least one client device;
   a random number generator, coupled to the network interface, that generates a random number;
   a sanction processing module, coupled to the random number generator and the network interface, that, in response to the request for the media content, generates the first sanction data based on the random number and generates the second sanction data based on the random number;
   wherein the caching server generates first cryptographic data based on the first sanction data and sends the first cryptographic data to the at least one client device;
   wherein the at least one client device generates second cryptographic data based on the second sanction data and sends the second cryptographic data to the caching server;
   wherein the caching server generates a scrambling control word for scrambling the media content based on the first sanction data and the second cryptographic data;
   wherein the at least one client device generates the scrambling control word for descrambling the media content based on the second sanction data and the first cryptographic data; and
   wherein the first sanction data, the second sanction data, the first cryptographic data and the second cryptographic data are generated in accordance with an asymmetrical public key cryptography algorithm.

2. The sanction server of claim 1 wherein the sanction processing module further generates, in response to the request for the media content, notification data that indicates the at least one client device and the media content; and
   wherein the network interface further sends the notification data to the caching server via the at least one network.

3. The sanction server of claim 1 wherein the sanction processing module authenticates the request for the media content from the at least one client device based on certificate data from a signing authority.

4. The sanction server of claim 1 wherein the sanction processing module signs the first sanction data and the second sanction data based on certificate data from a signing authority.

5. A method for cryptographic sanctioning of secure transmission of media content from a caching server to at least one client device, the method comprising:
   receiving a request for the media content from the at least one client device at a sanction server;
   generating a first random number at the sanction server;
   generating first sanction data based on the random number via the sanction server and transmitting the first sanction data to the caching server; and
   generating the second sanction data based on the random number via the sanctioning server and transmitting the second sanction data to the at least one client device;
   wherein the caching server generates first cryptographic data based on the first sanction data and sends the first cryptographic data to the at least one client device;
   wherein the at least one client device generates second cryptographic data based on the second sanction data and sends the second cryptographic data to the caching server;
   wherein the caching server generates a scrambling control word for scrambling the media content based on the first sanction data and the second cryptographic data;
   wherein the at least one client device generates the scrambling control word for descrambling the media content based on the second sanction data and the first cryptographic data; and
   wherein the first sanction data, the second sanction data, the first cryptographic data and the second cryptographic data are generated in accordance with an asymmetrical public key cryptography algorithm.

6. The method of claim 5 further comprising;
   generating, at the sanction server and in response to the request for the media content from the at least one client device, notification data that indicates the at least one client device and the media content; and
   sending the notification data to the caching server via the at least one network.

7. The method of claim 5 further comprising:
receiving, at the sanction server, certificate data from a signing authority; and
authenticating, via the sanction server, the request for the media content from the at least one client device based on the certificate data.

8. The method of claim 5 further comprising:
receiving, at the sanction server, certificate data from a signing authority; and
signing, via the sanction server, the first sanction data and the second sanction data based on the certificate data.

9. The method of claim 5 further comprising:
generating a second random number via the caching server;
wherein the first cryptographic data is generated at the caching server, further based on the second random number.

10. The method of claim 5 further comprising:
generating a third random number via the at least one client device;
wherein the second cryptographic data is generated at the at least one client device, further based on the third random number.

11. The sanction server of claim 1 wherein the first sanction data, the second sanction data, the first cryptographic data and the second cryptographic data are generated in accordance with an elliptic curve cryptography algorithm.

12. The method of claim 5 wherein the first sanction data, the second sanction data, the first cryptographic data and the second cryptographic data are generated in accordance with a Rivest, Shamir, Adelman (RSA) cryptography algorithm.

13. The method of claim 5 wherein the first sanction data, the sanction data, the first cryptographic data and the second cryptographic data are generated in accordance with an elliptic curve cryptography algorithm.

* * * * *